United States Patent [19]

Harris, III

[11] 3,995,145

[45] Nov. 30, 1976

[54] MAGNETIC DATA READER EMPLOYING MAGNETICALLY OPERATED SOLID STATE SWITCHES, AND READER-LOCK COMBINATION

[75] Inventor: Newton T. Harris, III, Woodland Hills, Calif.

[73] Assignee: Greer Hydraulics, Inc., Los Angeles, Calif.

[22] Filed: Mar. 7, 1975

[21] Appl. No.: 556,452

[52] U.S. Cl. .......................... 235/61.11 D; 200/46; 340/174 HA
[51] Int. Cl.² ................. G06K 7/08; H01H 43/08; G11C 11/02
[58] Field of Search ............ 235/61.11 D, 61.12 M; 200/46; 340/174 HA

[56] References Cited
UNITED STATES PATENTS

| | | | |
|---|---|---|---|
| 3,634,657 | 1/1972 | Ballard et al. | 235/61.11 D |
| 3,651,312 | 3/1972 | Barney | 235/61.12 M |
| 3,788,617 | 1/1974 | Barney | 235/61.11 D |
| 3,860,796 | 1/1975 | Wallace et al. | 235/61.12 M |
| 3,862,399 | 1/1975 | Cain | 235/61.12 M |

*Primary Examiner*—Daryl W. Cook
*Attorney, Agent, or Firm*—Gardner and Anten

[57] ABSTRACT

A card reader utilizing an array of magnetically-operable solid state switches for reading magnetically coded cards. Magnets are employed to provide magnetic fields of sufficient strengths from poles of specific polarity to trigger or actuate some or all of the solid state switches. An array or matrix of the magnetically-operable solid state switches are provided in combination with a magnet-carrying block having magnets disposed therein. In several embodiments the magnets are slidably mounted in the block and are adapted to be attracted or repelled by a properly coded card having magnetized spots arranged in a predetermined pattern therein. In two preferred embodiments the card reader is combined with a card-operable magnetic lock. In that embodiment some of the magnets in the magnet-carrying block function as locking elements or tumblers.

14 Claims, 18 Drawing Figures

MAGNETIC DATA READER EMPLOYING MAGNETICALLY OPERATED SOLID STATE SWITCHES, AND READER-LOCK COMBINATION

BACKGROUND OF THE INVENTION

In the field of access control and monitoring, cards having magnetically-encoded data have been known and used for one or both of two functions, i.e., (1) as a key for unlocking a lock, and/or (2) for providing information (e.g., employee identification, time of arrival and/or departure) to a central control or monitoring station.

By way of example, U.S. Pat. Nos. 2,648,729 RE. 27,753 and 2,931,953 show locks having tumblers (i.e., locking elements) in the form of magnets which are adapted to be unlocked by a key in the form of a card having ferrous shims (e.g., see U.S. Pat. No. 2,648,729), magnetized spots (e.g., see U.S. Pat. No. 3,611,763) or magnets (e.g., see U.S. Pat. No. 2,931,953) therein.

The prior art literature also shows card readers for detecting or reading cards having information encoded thereon. The information on the cards is typically magnetically encoded, and the detectors or sensing elements in the card readers may be sensing transformers (e.g., see U.S. Pat. No. 3,422,252), magnetic coils (e.g., see U.S. Pat. No. 3,717,749), Hall effect devices (e.g., see U.S. Pat. No. 3,634,657), reed switches (e.g., see U.S. Pat. No. 3,581,080) and other switching devices.

It is also known in the prior art to combine locks having magnetic tumblers (e.g., as shown in U.S. Pat. No. RE 27,753) with card readers. For example, see U.S. Pat. No. 3,581,030 which combines a programmable lock such as shown in U.S. Pat. No. RE. 27,753 with a card reader utilizing reed switches as the sensing elements.

While the prior art card readers (such as those described above, for example) have met with some acceptance in the market place, there are problems and/or drawbacks associated with each.

For example, the reed switch type readers (such as disclosed in U.S. Pat. No. 3,581,030) are relatively expensive and somewhat complex to assemble. All of the reed switches, for example, must be precisely aligned and hand soldered in place. However, the switches must be calibrated, checked, recalibrated and rechecked to ensure reliable operation. Still further, such reed switches are of relatively small reliability when used with magnetically encoded cards whose magnetic spots are of relatively low magnetic strength (e.g., less than 100 gauss).

The prior art card readers which have employed Hall effect devices (such as shown, for example, in U.S. Pat. No. 3,634,657) have utilized Hall effect cells which are either (1) highly sensitive and relatively expensive, or (2) incapable of reading magnetized spots or elements having relatively weak magnetic fields (e.g., below about 100 gauss). Thus, in order to provide magnetically-coded cards, such as the card shown in U.S. Pat. No. 3,611,763, for example, having magnetized spots of sufficient magnetic strength to trigger or actuate a Hall effect device of the type shown in U.S. Pat. No. 3,634,657, it is necessary to purchase relatively expensive magnetizable material for the cards. By way of example, the cost of the magnetizable material for use in key cards having magnetized spots of sufficient magnetic strength to trigger a relatively insensitive Hall effect cell may be four times as great as the cost of the same type magnetizable material which cannot be magnetized with sufficient magnetic strength to be read by insensitive cells.

SUMMARY OF THE INVENTION

It is an object of the present invention to provide an improved card reader and card reader-lock device which overcomes the deficiencies of the prior art readers and reader-lock devices such as those discussed above.

In its simplest form, the present invention comprises a matrix or an array of magnetically-operable solid state switches to magnetically sense or read suitably coded information on cards having relatively weak magnetized spots or elements, or ferrous metal elements therein. Since the magnetized spots or elements in the cards may not have strong enough magnetic fields to actuate or trigger the solid state switches, and since the ferrous metal shims will not trigger the magnetically-operable switches, a matrix or array of magnets corresponding to the matrix of the solid state switches, is provided in close proximity to the station or slot on or into which the card-to-be-read is placed. These magnets are attracted or repelled by the magnetic spots or elements or the ferrous shims in the cards into close enough proximity with the solid state switches to trigger or actuate them.

BRIEF DESCRIPTION OF THE DRAWINGS

In the drawings:

FIGS. 10A and 10B are sectional elevation views of the magnetic card reader and magnetically-operable lock mechanism shown in FIG. 10. FIG. 10A shows the mechanism without the program card and passcard in place. FIG. 10B shows the program card and passcard in place in their respective slots in the mechanism.

DETAILED DESCRIPTION OF THE PREFERRED EMBODIMENTS

Figure 1:
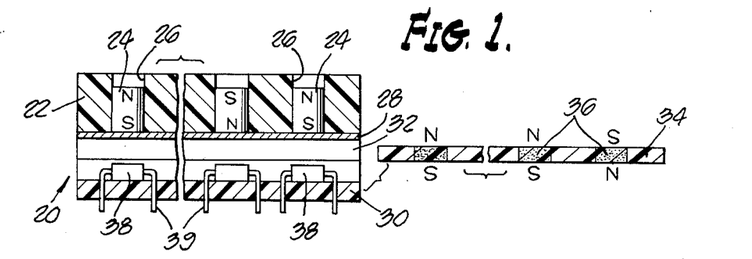
FIG. 1 is a sectional elevation view, partly broken away, of one embodiment of a magnetic card reader constructed in accordance with the teachings of the present invention, and showing a key card about to be inserted into the reader.
Figure 2:
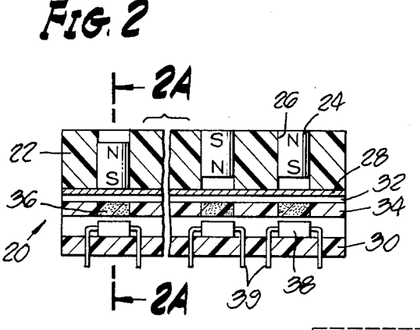
FIG. 2 is a sectional elevation view of the card reader shown in FIG. 1, with a key card inserted in the reader.
Figure 2A:
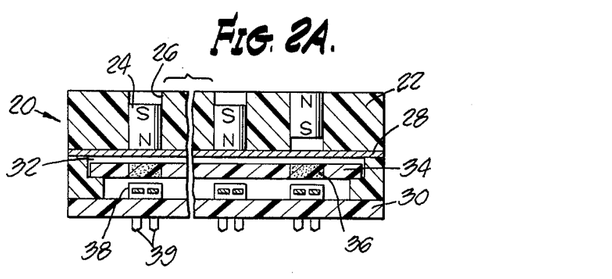
FIG. 2A is a sectional elevation view taken along the plane 2A—2A of FIG. 2 and looking in the direction of the arrows.

An exemplary embodiment of a simplified form of the card reading apparatus of the present invention is shown in FIGS. 1, 2 and 2A. In FIG. 1 the apparatus is shown with a passcard 34 about to be inserted therein. In FIGS. 2 and 2A the apparatus is shown with the passcard inserted in place.

The card reader 20 of FIGS. 1, 2 and 2A comprise a magnet-carrying block 22 having a plurality of elongated, cylindrical magnets 24, 24 . . . 24 disposed in cylindrical channels 26, 26 . . . 26 in the block.

A sheet 28 of non-ferrous material (e.g., plastic, aluminum or the like) is provided beneath the magnet-carrying block 22 to prevent the magnets 24, 24 . . . 24 from dropping completely out of their respective channels 26, 26 . . . 26.

A substrate 30 is disposed beneath the non-ferrous sheet 28 and is spaced therefrom to define a slot 32 which is adapted to receive a card 34 having a plurality of magnetized spots 36, 36 . . . 36 thereon.

The substrate 30 has a matrix or an array of magnetically-operable solid state switches 38, 38 . . . 38 mounted thereon. It is contemplated that the substrate 30 may be a printed circuit board into which the switches 38, 38 . . . 38 are electrically connected.

For the sake of clarity, only three magnets 24, magnetized spots 36 and switches 38 are shown in each of the partially broken away views of FIGS. 1, 2 and 2A (and also in the views of several other embodiments disclosed and described herein). It is to be understood, however, that it is contemplated that any desired number of magnets, magnetized spots and switches will be employed in the magnet-carrying block 22, in the card 34 and on the substrate 30.

The leads 39, 39 from each of the switches 38, 38 . . . 38 may be directly or indirectly (e.g., through printed circuit board connections) connected to any suitable or desired data acquisition system or data reception center (not shown).

Figure 3:
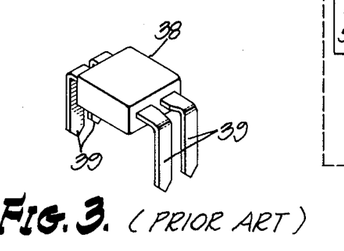
FIG. 3 is a perspective view of an available (i.e., prior art) magnetically operated solid state switch which may be employed in connection with the reader or reader-lock of the present invention.

One of the magnetically-operable solid state switches 38 (which is conventional, per se) is shown in FIG. 3. The switch 38 is preferably of the type which is adapted to be triggered or actuated when a magnet pole of selected polarity (i.e., north or south; south in the exemplary embodiment of FIGS. 1, 2 and 2A) of sufficient magnetic strength is brought into close proximity therewith. One example of such a switch, known as an "SS Magnetically Operated Solid State Switch", is sold by the Micro Switch Division of Honeywell.

Figure 4:
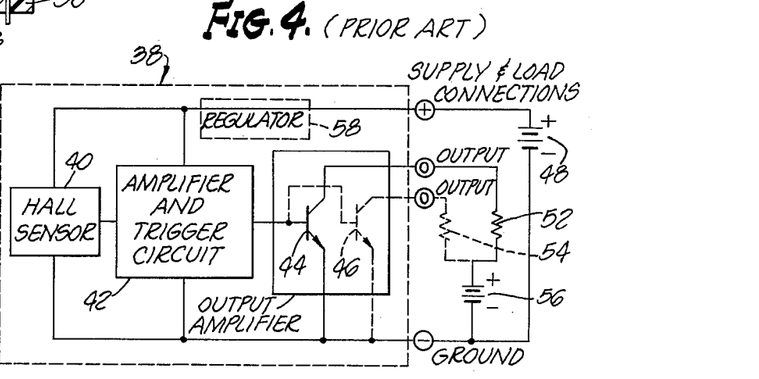
FIG. 4 is a circuit diagram of one type of a magnetically operated switch of the type shown in FIG. 3 (prior art), such circuit being known as a "current sinking" circuit.

A circuit diagram of the magnetically-operable solid state switch 38 is illustrated in FIG. 4. The switch 38 comprises a Hall sensor 40, an amplifier and trigger circuit 42 and one or two transistors 44 and/or 46.

As shown in FIG. 4, voltage from a D.C. source 48 is supplied to the switch 38. The output from the collectors of the transistors 44 and 46 is fed through a load, illustrated by resistors 54, 52 in FIG. 4, and an optional load voltage 56, to ground. The load, indicated by resistors 52 and 54 in FIG. 4, may be a logic gate such as an AND, OR or NAND gate, for example.

The magnetically-operable switch 38 may also include a voltage regulator 58 if desired.

The passcard 34 shown in FIGS. 1, 2 and 2A may be of the type shown in U.S. Pat. No. 3,611,763. As described in said patent, the card 34 may include ferromagnetic particles suspended in a plasticized binder material so that the card can be selectively magnetized at selected discrete spots (e.g., 36, 36 . . . 36). If a relatively inexpensive material is used in the card 34, the poles of the magnetized spots 36, 36 . . . 36 on the passcard 34 will not be of sufficient magnetic strength to trigger the switches 38, 38 . . . 38, when the card is placed in the slot 32. Accordingly, the magnets 24, 24 . . . 24 are employed to strengthen or add to the magnetic strength of the fields of magnetized spots 36, 36 . . . 36 so as to trigger the switches 38, 38 . . . 38.

This is accomplished in the following manner. When the card 34 is inserted into the slot 32 of the reader 20, the magnetized spots 36, 36 . . . 36 will overlie the magnetically-operable switches 38, 38 . . . 38, as shown in FIGS. 2 and 2A. With the spots 36, 36 . . . 36 and the magnets 24, 24 . . . 24 poled as shown in FIGS. 1 and 2, the left magnet 24 (as viewed in FIGS. 1 and 2) will be attracted toward the left magnetized spot 36 and the left switch 38, and the center and right magnets 24, 24 will be repelled. Accordingly, the South magnetic pole of the magnetic field generated by the combined fields of the left magnet 24 and the left magnetized spot 36 on the card 34 will trigger or actuate the left switch 38 to provide an output signal to the load 52, 54 (FIG. 4).

No output signal will be generated by the center and right switches 38, 38 (which are current sinking switches, as shown, for example, in FIG. 4) because the distance between the repelled center and right magnets 24, 24 and their respective underlying switches 38, 38 will be so great that the magnetic fields from these magnets will not trigger or actuate the center and right switches 38, 38.

The output signal from the left switch 38 and the absence of signals from the center and right switches 38, 38 will provide the desired information to any suitable data acquisition system, e.g., logic circuitry (not shown) to which the switches 38, 38 . . . 38 are connected.

Figure 5:
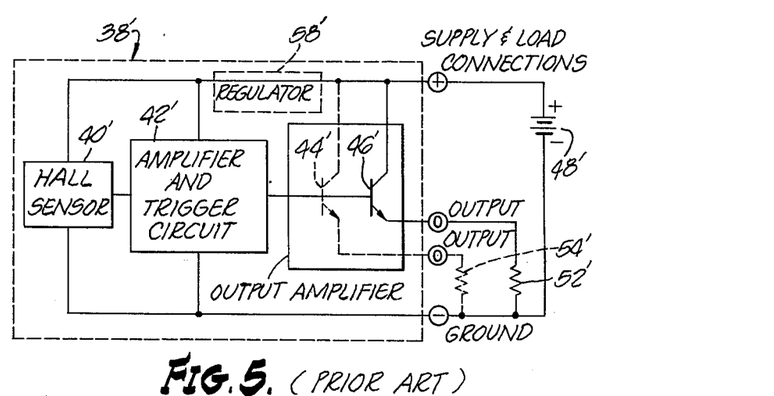
FIG. 5 is a circuit diagram of another type of a magnetically operated switch of the type shown in FIG. 3 (prior art), such circuit being known as a "current sourcing" circuit.

FIG. 5 shows the circuit diagram of an alternative embodiment of an available magnetically-operable solid state switch 38' which may be used in the apparatus of the present invention in the same manner as the switch 38. The switch 38' includes a Hall sensor 40', an amplifier and a trigger circuit 42' and one or two transistors 44' and/or 46'. The switch 38' may also include a voltage regulator 58'.

The primary difference between the switch 38 of FIGS. 1–4 (whose circuitry is known as a current sinking circuit) and the switch 38' of FIG. 5 (whose circuitry is known as a current sourcing circuit), is in the output from the switch. By comparing the circuitry of FIGS. 4 and 5, it will be noted that the output terminals of switch 38 (FIG. 4) are connected to the collectors of the transistors 44 and 46, while the output terminals of the switch 38' (FIG. 5) are connected to the emitter followers of the transistors 44' and 46'. Thus, the current sinking type switch 38 (FIG. 4) feeds current to the load 52, 54, while the current sourcing switch 38' (FIG. 5) receives current from the load 52', 54'.

Figure 2B:
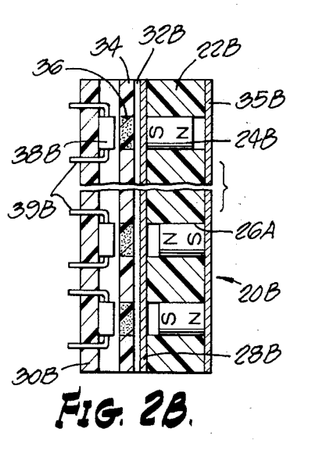
FIG. 2B is a sectional elevation view showing a card reader similar to the reader of FIGS. 1, 2 and 2A, but provided with a ferrous metal biasing plate which permits the reader to be disposed in virtually any desired position.

FIG. 2B shows a card reader 20B which is similar to the card reader 20 shown in FIGS. 1, 2 and 2A. However, the card reader 20B shown in FIG. 2B is provided with a ferrous metal sheet 35B on one side of a magnet-carrying block 22B (i.e., the side of the block 22B opposite from the side adjacent the card-receiving slot 32B). The ferrous metal sheet 35B normally (i.e., in the absence of a passcard 34 in the slot 32B) attracts all of the magnets 24B toward it. This permits the reader 20B to be disposed in virtually any desired position, such as the vertical position shown in FIG. 2B.

With the exception of the ferrous metal sheet 35B, the card reader 20B is virtually identical to the card reader 20 shown in FIGS. 1, 2 and 2A. The card reader 20B comprises a magnet-carrying block 22B having a plurality of elongated, cylindrical magnets 24B, 24B . . . 24B disposed in cylindrical channels 26B, 26B . . . 26B in the block.

A sheet 28B of non-ferrous material (e.g., plastic, aluminum or the like) is provided on one side of the magnet-carrying block 22B to limit movement of the magnets 24B, 24B . . . 24B.

A substrate 30B (which may be a printed circuit board, if desired) is disposed on the left side of the non-ferrous sheet 28B and is spaced therefrom to define a slot 32B which is adapted to receive a passcard 34 having a plurality of magnetized spots 36, 36 . . . 36 thereon.

The substrate 30B has a matrix of magnetically-operable solid state switches 38B, 38B . . . 38B mounted thereon. If the substrate 30B is a printed circuit board, the switches 38B, 38B . . . 38B may be electrically integrated thereon.

The leads 39B, 39B from each of the switches 38B, 38B . . . 38B may be directly or indirectly (e.g., through printed circuit board connections) connected to any suitable or desired data acquisition system (not shown).

When a properly coded passcard or key card 34 is inserted into the card-receiving slot 32B of the reader 20B, the magnetized spots 36, 36 . . . 36 will be aligned with the magnetically-operable switches 38B 38B . . . 38B as shown in FIG. 2B. With the spots 36, 36 . . . 36 and the magnets 24B, 24B . . . 24B poled as shown in FIG. 2B, the upper magnet 24B (as viewed in FIG. 2B) will be attracted away from the ferrous metal sheet 35B and toward the upper magnetized spot 36 and the uppermost switch 38B. The center and lower magnets 24B, 24B will remain attracted to the ferrous metal sheet 35B since the center magnetized spot 36 has its North pole facing the North pole of the center magnet 24B and the lowermost magnetized spot 36 has the South pole facing the South pole of its aligned magnet 24B. Accordingly, the South magnetic pole of the magnetic field generated by the combined fields of the uppermost magnet 24B and the uppermost magnetized spot 36 will trigger or actuate the uppermost switch 38B to provide an output signal from the leads 39B, 39B of the uppermost switch 38B.

Numerous other variations of the embodiment of the present invention shown in FIGS. 1, 2, 2A and 2B are contemplated. For example, the positions of the magnet block 22 and the printed circuit board 30 may be inverted, as shown in the embodiments of FIGS. 6 and 7.

Figures 6, 7, 7A, 8, 9, 9A:
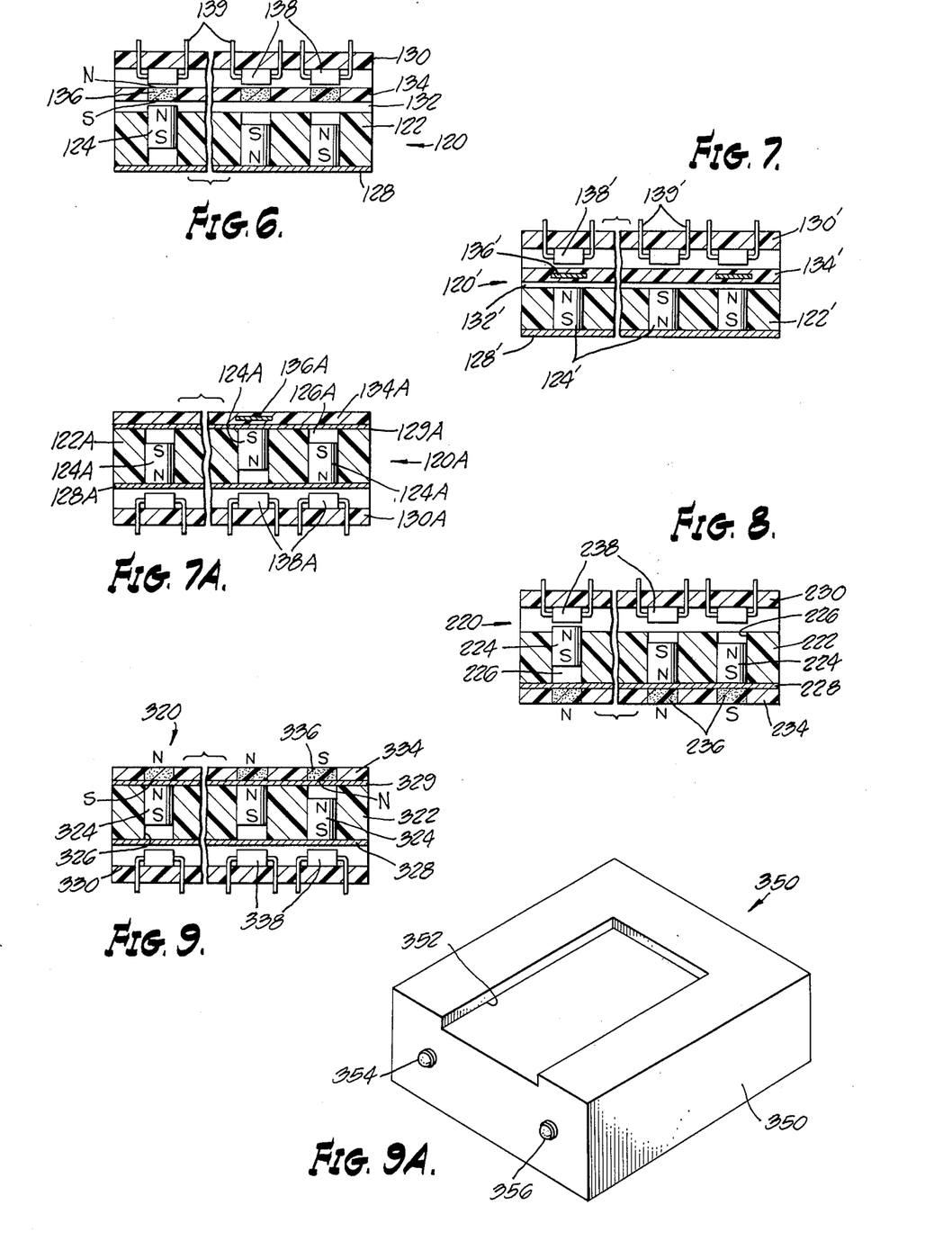
FIG. 6 is a sectional elevation view, partly broken away, of another embodiment of a magnetic cord reader constructed in accordance with the teachings of the present invention and showing one type of key card (commonly known as a "programmable" card) inserted in the card reader.
FIG. 7 is a sectional elevation view, partly broken away, of a card reader virtually identical to the card reader shown in FIG. 6, but showing a key card of the type known as a "shim" card inserted in the card reader.
FIG. 7A is a sectional elevation view, partly broken away, of another embodiment of a card reader constructed in accordance with the teachings of the present invention, with a so-called "shim" card positioned to be read by the reader.
FIG. 8 is a sectional elevation view, partly broken away, of still another embodiment of a magnetic card reader constructed in accordance with the teachings of the present invention.
FIG. 9 is a sectional view, partly broken away, of a card reader which is virtually identical to the card reader shown in FIG. 7A, but with a so-called programmable key card positioned to be read by the reader.
FIG. 9A is a perspective view of a housing for a card reader of the type shown, for example, in FIGS. 7A and 9.

Referring to FIG. 6, a magnet-carrying block 122 is positioned and spaced beneath a switch-carrying substrate (or circuit board) 130 to define a card-receiving slot 132 therebetween.

A sheet 128 of non-ferrous material (e.g., plastic, aluminum or the like) is provided beneath the magnet-carrying block 122 to prevent the magnets 124, 124 . . . 124 from dropping out of their respective channels 126, 126 . . . 126 in the magnet-carrying block 122.

A plurality of magnetically-operable solid state switches 138, 138 . . . 138 are mounted on the substrate (or printed circuit board) 130 facing the card slot 132 and aligned with the magnets 124, 124 . . . 124 in the magnet-carrying block 122.

The magnetically-operable solid state switches 138, 138 . . . 138 may be identical to the switches 38, 38 . . . 38 shown in the embodiments of FIGS. 1–4.

In the exemplary embodiment shown in FIG. 6, each of the switches 138, 138 . . . 138 is designed to be actuated (i.e., to produce an output signal) when a North magnetic pole of sufficient magnetic strength is moved into proximity with the switch.

When the card 134 having magnetized spots thereon (such as the card shown in U.S. Pat. No. 3,611,763, for example) is inserted into the slot 132, the spots 136, 136 . . . 136 on the card will attract one or more of the magnets 124, 124 . . . 124 upwardly, but will not attract the remaining magnets.

In the exemplary embodiment shown in FIG. 6, the left magnetized spot 136 (which has its North pole facing the overlying solid state switch 138) will attract the underlying magent 124 which has its North pole facing upwardly. The center magnetized spot 136 and the right magnetized spot 136 will not attract their respective underlying magnets 124, 124 upwardly. In fact, the center and right spots (polarized as shown in FIG. 6) will repel their respective underlying magnets.

The magnetically-operable solid state between 138, 138 . . . 138 may not be sensitive enough to be actuated by the relatively weak poles of the magnetized spots 136, 136 . . . 136 on the card 134. However, the left switch 138 shown in FIG. 6 will be actuated by the North pole of the combined fields of the left magentic spot 136 on the card 134 and the magnet 124 which the left spot 136 attracts.

FIG. 7 illustrates a card reader 120' which is adapted to be used in conjunction with a shim type card (such as the cards shown, for example, in U.S. Pat. Nos. 2,595,769 and 2,648,729).

The card reader 120' includes a magnet-carrying block 122' having a plurality of generally cylindrical magnets 124', 124' ... 124' disposed therein. A sheet 128' is provided beneath the magnet-carrying block 122' to prevent the magnets 124', 124' ... 124' from dropping out of their respective channels 126', 126' ... 126' in the magnet-carrying block 122'.

It will be noted that the magnet-carrying block 122' and the magnets carried thereby are disposed beneath and spaced from a switch-carrying substrate (or circuit board) 130' to define a card-receiving slot 132' therebetween. A plurality of magnetically-operable solid state switches 138', 138' ... 138' are mounted on the substrate 130' (or the printed circuit board) so as to be facing the card slot 132' and so as to be aligned with the magnets 124', 124' ... 124' in the magnet-carrying block 122'.

It will be noted that the magnets 124', 124' ... 124' are not slidable in their respective channels but are stationary.

As shown in FIG. 7, the shim-type card 134' which is adapted to be received in the slot 132' has a plurality of shims 136' mounted therein.

Normally (i.e., in the absence of a card in the slot 132') the switches 138', 138' ... 138' are in either an off or an on condition. Assuming that the switches 138', 138' ... 138' are of the type adapted to sense the presence of a South magnetic pole, the leftmost switch 138' and the rightmost switch 138' will normally be in an on condition or state, because the magnets 124', 124' which underlie those switches have their North poles facing upwardly.

When the card 134' is inserted in place in the slot 132', the leftmost shim 136' and the rightmost shim 136' in the card 134' will shunt the magnetic fields from the respective magnetic poles which they overlie. As a result, these switches will be turned to their off states. The centermost switch 138' will remain in its on state since there is no shim or other metallic material to shunt the field from the South pole which faces the center switch.

Of course, the reader 120' shown in FIG. 7 can be designed so that the switches 138', 138' ... 138' are normally in an off state or condition, and are turned on by the absence of a magnetic field of a given polarity; i.e., when a shim is inserted between the magnet 124' and the switch 138'.

FIG. 7A also shows a card reader 120A which is adapted for use in conjunction with a shim type card. The reader 120A includes a magnet-carrying block 122A having a plurality of generally cylindrical magnets 124A, 124A ... 124A slidably disposed in channels 126A, 126A ... 126A therein. A non-ferrous bottom plate 128A is disposed beneath the magnet-carrying block to prevent the magnets 124A, 124A ... 124A from dropping out of their respective channels 126A, 126A ... 126A; and a non-ferrous upper cover plate 129A is disposed above the magnet-carrying block 122A to prevent the magnets from being attached out of their respective channels.

A switch-carrying substrate 130A is disposed beneath the bottom plate 128A and has a plurality of magnetically-operable solid state switches 138A, 138A ... 138A mounted thereon. Each of the switches 138A is disposed directly beneath one of the magnets 124A. In the exemplary embodiment shown in FIG. 7A, each of the switches 138A is adapted to be triggered or actuated by the presence of a North pole of a predetermined magnetic strength. The reader 120A is adapted to receive a card above the upper cover plate 129A.

In the exemplary embodiment shown in FIG. 7A, a shim type card 134A having a ferrous shim 136A embedded therein is disposed on the upper cover plate 129A. The ferrous shim 136A is aligned with the center magnet 124A shown in FIG. 7A, and will attract the magnet upwardly so that the North (bottom) pole of the center magnet 124A is spaced from the underlying center switch 138A so that the magnetic field from the North pole will not trigger or actuate the center switch 138A.

Since no ferrous shim in the card 134A overlies the left or right magnets 124A, 124A, those magnets will remain in the down position shown in FIG. 7A and will, when power is supplied to the switches 138A, 138A ... 138A, trigger or actuate their respective underlying switches 138A, 138A.

Of course, the magnetically operable switches 138A, 138A ... 138A may be actuated or triggered by the absence of a sufficiently strong magnetic pole, rather than by the presence of such a pole.

Another embodiment of a card reader 220 constructed in accordance with the teachings of the present invention is shown in FIG. 8. In FIG. 8, a magnet-carrying block 222 having channels 226, 226 ... 226 with magnets 224, 224 ... 224 slidably disposed therein is disposed directly beneath a substrate (or a printed circuit board) 230 having magnetically-operable solid state switches 238, 238 ... 238 mounted therein. The magnetically-operable solid state switches 238, 238 ... 238 may be of the current sinking type of switch (such as shown in FIG. 4) and are adapted to sense a North magnetic pole having a magnetic strength above a predetermined level.

A bottom sheet 228 of non-ferrous material is provided beneath the magnet-carrying block 222 to prevent the magnets 224, 224 ... 224 from dropping out of their respective channels 226, 226 ... 226.

As shown in FIG. 8, the card reading device 220 is designed to receive a card-to-be-read beneath the magnet-carrying block 222 and the non-ferrous bottom sheet 228. When a passcard 234 having magnetized spots 236, 236 ... 236 thereon is placed at a card-receiving station or position beneath the magnet-carrying block 222, the magnetized spots 236, 236 ... 236 in the card 234 will attract one or more of the magnets 224 in the block 222 and will repel the other magnet or magnets.

With a card 234 presented at the card-receiving station beneath the magnet-carrying block 222 and having magnetized spots thereon polarized as shown in FIG. 8, the North pole of the left magnet 224 will be repelled into sufficient proximity with the switch 238 to trigger or actuate the switch, while the center and right magnets 224, 224 will remain spaced from their overlying switches 238, 238 and will not actuate their respective overlying switches.

A further embodiment of the present invention is shown in FIG. 9.

The card reader 320 in FIG. 9 is virtually identical to the card reader 120A shown in FIG. 7A. However, the passcard 334 used in conjunction with the reader 320 of FIG. 9 is a programmable-type card, such as the card described in U.S. Pat. No. 3,611,763, and the polarity pattern of the magnets 324, 324 . . . 324 is different.

The card reader 320 includes a magnet-carrying block 322 having a plurality of generally cylindrical holes or channels 326, 326 . . . 326 therein. Generally cylindrical magnets 324, 324 . . . 324 are slidably disposed in the holes 326, 326 . . . 326. A lower plate 328 of non-ferrous material and an upper plate 329 of non-ferrous material are disposed directly beneath and above the magnet-carrying block 322 to prevent the magnets 324, 324 . . . 324 from dropping out of or being attracted out of their respective holes 326, 326 . . . 326.

A substrate or a printed circuit board 330 is disposed beneath the magnet-carrying block 322 and the lower non-ferrous plate 328. The substrate 330 has a plurality of magnetically-operable solid state switches 338, 338 . . . 338 mounted therein and aligned with magnets 324, 324 . . . 324 in the magnet-carrying block 322.

As shown in FIG. 9, the card reader 320 is designed to receive a card-to-be-read at a station or position located directly above the upper non-ferrous cover plate 329.

The magnetically-operable solid state switches 338, 338 . . . 338 employed in the reader 320 shown in FIG. 9 are of the type which are adapted to be triggered or actuated by a pole of predetermined polarity and of a predetermined magnetic strength. By way of example, the switches 338, 338 . . . 338 will hereinafter be considered to be adapted to be triggered or actuated by a South magnetic pole.

When a card 334 is placed in a position to be read by the reader 320, as shown in FIG. 9, the magnetized spots 336, 336 . . . 336 on the card will be aligned with magnets 324, 324 . . . 324 in the magnet-carrying block 322. Assuming that the card 334 shown in FIG. 9 has spots 336, 336 . . . 336 thereon which are polarized as shown in FIG. 9, the left and center spots 336, 336 will attract their respective underlying magnets upwardly and out of proximity with the respective underlying switches 338, 338. The right magnet 324 will remain in its down position, as shown in FIG. 9, due to both the force of gravity and the repelling force of the North pole of the right spot 336 which overlies the right magnet 324.

FIG. 9A of the drawings shows a card reader housing 350 which may be employed to house either the reader 120A shown in FIG. 7A or the reader 320 shown in FIG. 9.

Referring to FIG. 9A, the housing 350 is of a box-shaped configuration and is provided with a generally rectangular cutaway section 352 which is sized to receive a card-to-be-read (not shown). The housing 350 may also be provided with light 354 and 356 (e.g., green and red). One of the lights 354, 356 may be lighted when a properly coded card is positioned in the cutaway portion 352 to indicate to the cardholder that the reader is either ready to read the card or is in the process of reading it, and the other light may indicate that the reading process has been completed so that the cardholder may remove his card.

The reader housing 350 shown in FIG. 9A may be provided with any suitable means, such as a switch (not shown) adapted to be actuated when a card is inserted in the cutaway section 352 to turn on the light 354. Alternatively, one of the magnetized spots or shims in the card-to-be-read may be a data enable spot which will, either alone or in conjunction with a movable magnet, actuate a magnetically-operable switch (or other suitable mechanism) to simultaneously light the ready light 354 and enable the reader circuitry (not shown) to read the card.

While the housing 350 as shown in FIG. 9A is disposed in a generally horizontal attitude with the card-receiving slot 352 on top of the housing, it is contemplated, of course, that the housing may be mounted in any desired position, depending upon the card reader or reader-lock unit which is to be mounted in the housing.

It is further contemplated that the housing 350 may include means other than the cutaway section or card slot 352 for receiving a card-to-be-read. For example, indicator lines may be provided to show the proper manner of positioning the card-to-be-read at the card-receiving station; or there may be no indicator of any type on the housing so that the cardholder will have to know where to position the card-to-be-read.

Figure 10:
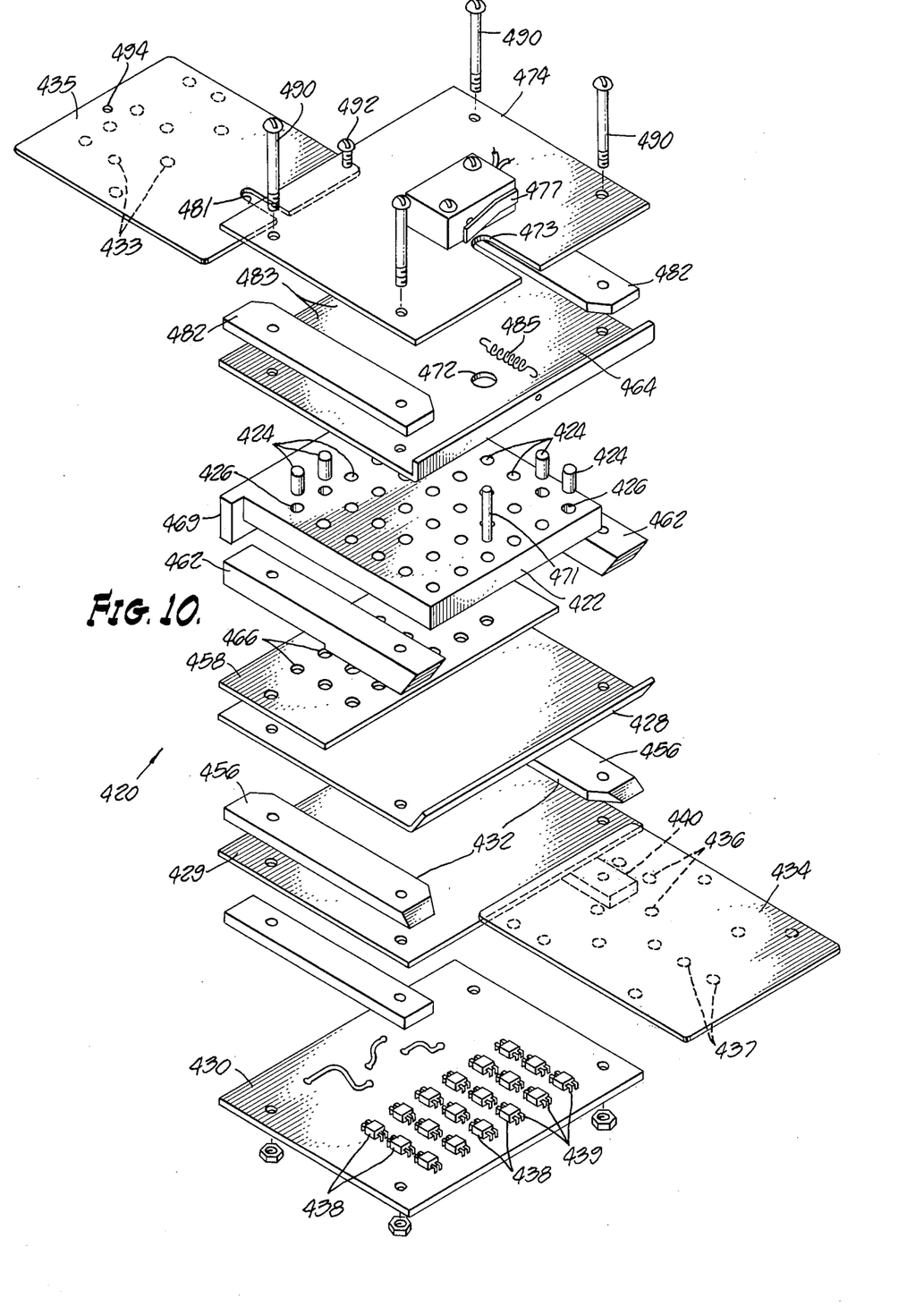
FIG. 10 is an exploded perspective view of a combination magnetic card reader and magnetically-operable lock mechanism constructed in accordance with the teachings of the present invention.
Figure 10A:
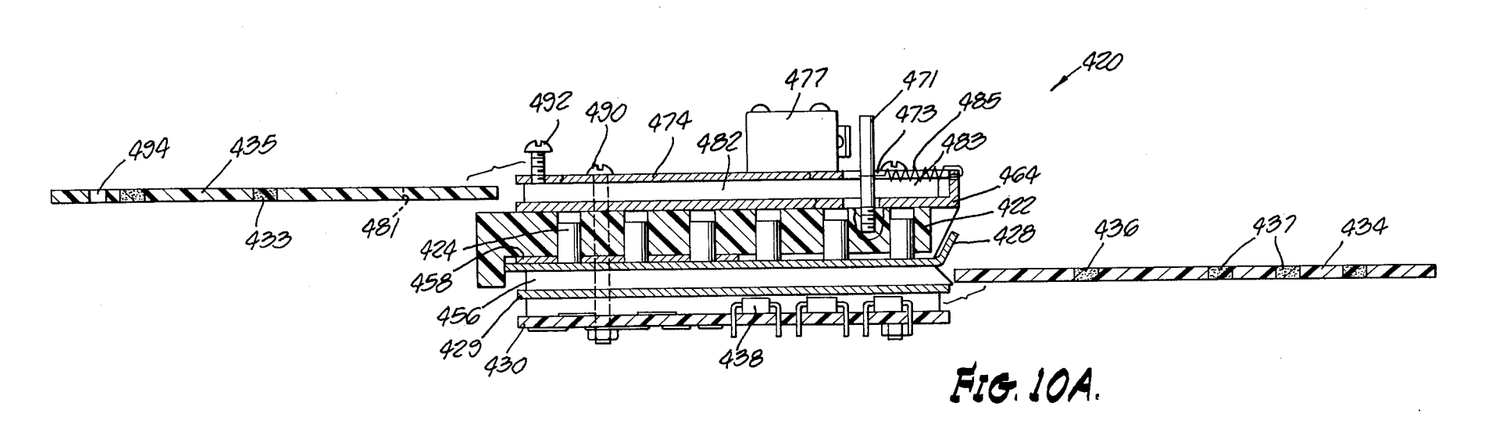
Figure 10B:
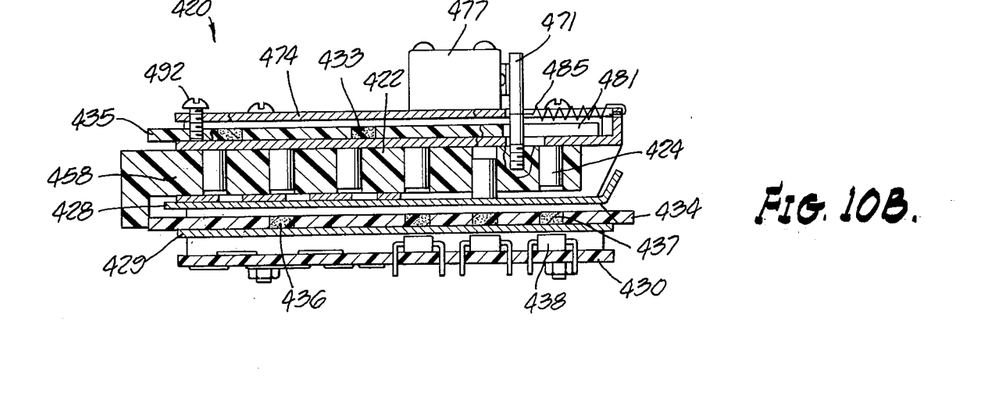

FIGS. 10, 10A and 10B show another preferred embodiment of the present invention wherein a printed circuit board 430 having magnetically-operable solid state switches 438, 438 . . . 438 electrically mounted thereon is combined with a programmable magnetic lock mechanism to form a card-operable lock-reader unit 420.

The programmable lock portion of the lock-reader unit 420 shown in FIGS. 10, 10A and 10B includes a magnet-carrying block 422 sandwiched between a locking plate 458 and an upper non-ferrous plate 464. The magnet-carrying block 422 is slidable between a pair of spaced side bars or rails 462, 462. A lower non-ferrous plate 428 is also provided beneath the locking plate 458 to prevent magnets 424 from dropping out of the magnet-carrying block 422.

The magnet-carrying block 422 has a plurality of channels 426, 426 . . . 426 therein, each of which is adapted to slidably carry a generally cylindrical magnet 424. The magnets 424 are slidable in their respective channels 426 in the magnet-carrying block 422 between an upper position wherein all of the magnets remain out of locking position, and a lower position, wherein at least one of the magnets extends into a locking hole 446 in the lock plate 458 to prevent relative sliding movement between the magnet-carrying block 422 and the lock plate 458.

It will be noted that approximately half of the magnets 424, 424 . . . 424 (i.e., the magnets in the rear or left half of the magnet-carrying block 422 shown in FIGS. 10, 10A and 10B) are disposed above the lock plate 458. Each of these magnets will extend into its respective underlying hole 466 in the locking plate 458 when it is in its lower position.

The lock plate 458 does not extend under the front or right half of the magnet-carrying block 422, as shown in FIG. 10. The magnets 424 in the channels 426 on the right side of the block 422 are provided solely for the purpose of establishing strong enough magnetic poles to trigger or actuate one or more of the magnetically-operable solid state switches 438, as described more fully hereinafter.

A pair of substantially parallel guide bars 456, 456, together with the lower non-ferrous plate 428 and a bottom non-ferrous plate 429, define a slot 432 for receiving a magnetically encoded passcard 434.

The passcard 434 is provided with a matrix of magnetized spots 436, 436 . . . 436 and 437, 437 . . . 437 thereon. The magnetized spots 436, 436 . . . 436 are provided on the left half of the card for attracting or repelling the magnets 424 in the left or rear portions of the magnet-carrying block 422 which overlies the locking plate 458. The magnetized spots 437, 437 . . . 437 are provided on the right half of the card 434 for attracting or repelling the magnets 424 which are disposed in the right or front half of the magnet-carrying block 422.

The passcard 434 is comprised, at least in part, of a plastic or rubber binder material having ferromagnetic particles or powder suspended in and substantially evenly distributed therein. The magnetic spots 436, 436 . . . 436 are magnetized in a direction substantially perpendicular to the surface of the card so as to provide one pole (e.g., North) extending toward one surface of the card and the opposite pole (e.g., South) extending toward the opposite surface of the card.

The lock portion of the unit shown in FIGS. 10, 10A and 10B is also provided with a top mounting plate 474 spaced from the upper non-ferrous plate 464 by a pair of guide bars or rails 482, 482 to define a slot 483 for receiving a program card or a combination set card 435.

The upper mounting plate 474 may have a microswitch 477 mounted thereon. The microswitch 477 is adapted to be actuated by an actuating pin 471 which extends upwardly from the magnet-carrying block 422 and through elongated slots 472, 481 and 473 in the upper plate 464, the program card 435 and the top plate 474, respectively. The actuator pin 471 (and, hence, the magnet-carrying block 422 in which it is mounted) is spring-biased toward the front or right end of the unit (as viewed in FIGS. 10, 10A and 10B) by means of a spring 485. Normally (i.e., in the absence of a properly coded passcard 434), the spring 485 will urge the actuator pin 471 and the magnet-carrying block 422 on which the pin is mounted toward the front or right (as shown in FIG. 10A) to a position where the actuator pin does not actuate the microswitch 477.

The left or rear end of the magnet-carrying block 422 is provided with a downwardly extending flange 469 which is adapted to be contacted and moved rearward by a properly coded passcard 434, as shown in FIG. 10B.

The lock portion of the unit shown in FIGS. 10, 10A and 10B is substantially identical to the programmable lock shown in U.S. Pat. No. RE 27,753. It will be noted, however, that the lock portion of the unit of the present invention is shown in an upside-down position as compared to the lock shown in U.S. Pat. No. RE. 27,753.

The lock-reader unit 420 of the present invention, shown in FIGS. 10, 10A and 10B, further comprises a printed circuit board 430 beneath the passcard slot 432. The printed circuit board 430 has a matrix of magnetically-operable solid state switches 438, 438 . . . 438 mounted on the forward or right end thereof. A pair of spacer bars 440, 440 are provided between the bottom plate 429 and the printed circuit board 430 to provide space for the switches 438, 438 . . . 438.

The magnetically-operable solid state switches 438, 438 . . . 438, are devices which, like the switch 38 shown in FIGS. 1–5, are adapted to be actuated or triggered by the magnetic field from a given magnetic pole (i.e., North or South) having a magnetic strength which is greater than some predetermined minimum.

The top of the printed circuit board 430 is preferably potted with a suitable epoxy (not shown) to protect it and the switches 438, 438 . . . 438 from damage due to insertion of the passcard 434, or due to vibration, shock, dust or other foreign matter and/or forces. Alternatively, the printed circuit board 430 may be protected by a non-ferrous cover plate 429, as shown in FIGS. 10, 10A and 10B.

The top mounting plate 474, the upper guide rails 482, 482, the upper plate 464, the intermediate guide rails 462, 462, the locking plate 458, the lower non-ferrous plate 428, the lower guide rails 456, 456, the bottom non-ferrous plate 429, spacer bars 440, 440 and the printed circuit board 430 are held together in a relatively compact sandwich arrangement by any suitable means, such as mounting screws 490, 490, 490, 490 and nuts 492, 492, 492, 492, for example.

While the magnet-carrying block 422 is slidable relative to the aforementioned fixed elements of the lock-reader unit 420 when all of the magnets 424, 424 . . . 424 on the left half of the block 422 are in their uppermost position, it will be noted that the actuating pin 471 which extends through the slots 472 and 473 in the plates 464 and 474, respectively, limits the distance of permissible sliding movement of the block 422 to the length of the slot 473.

The lock-reader unit 420 of the present invention shown in FIGS. 10, 10A and 10B operates in the following manner.

As shown in FIG. 10A, prior to the insertion of a combination set card 435 and a passcard 434, all of the magnets 424, 424 . . . 424 are held, by force of gravity, in their lowermost position. The magnets 424 on the rear or left side of the magnet-carrying block 422 have their lower ends extending into the underlying holes 466 in the locking plate 458 to prevent movement of the magnet-carrying block 422 relative to the fixed locking plate 458.

To program the locking section of the lock-reader unit 420, a program card or combination set card 435 having magnetized spots 433 thereon is inserted into the program card receiving slot 483. The program card 435 may be locked in place by means of a screw 492 which is adapted to be screwed downwardly and into a hole 494 provided in the left end of the program card. (See FIG. 10B).

The magnetized spots 433 on the left half of the program card 435 (as viewed in FIGS. 10A and 10B) will attract one or more of the locking magnets 424 upwardly, out of their respective underlying holes 466 in the locking plate 458.

Although not shown in the particular embodiments shown in the drawings, it is also contemplated that the program card 435 may be provided with magnetized spots on the right half thereof (as viewed in FIGS. 10A and 10B) so as to attract one or more of the magnets 424 on the forward or right side of the reader to move them out of proximity with its underlying switch 438 to disable that switch and prevent it from being actuated or triggered.

When a passcard holder desires access to some restricted area he places his passcard 434 in the passcard receiving slot 432. (See FIG. 10B.) If the passcard is properly coded (i.e., if the magnetized spots 436 on the left side of the passcard 434 are properly positioned and polarized) the magnetized spots on the passcard will repel the remaining locking magnets 424 (i.e., those magnets in the forward or left side of the magnet-carrying block 422 which are not lifted by the magnetized spots 433 on the program card 435) upwardly and out of their respective underlying holes 466 in the locking plate 458, as shown in FIG. 10B.

With all of the locking magnets 424 raised out of their locking holes 466 in the locking plate 458, the passcard may be pushed inwardly (i.e., to the left, as viewed in FIG. 10B) against the downwardly extending flange 469 on the rear end of the magnet-carrying block 422 to force the magnet-carrying block 422 and the actuating pin 471 mounted thereon rearwardly. As the actuating pin 471 moves rearwardly in the slots 472 and 473, the actuating pin will trip or actuate the microswitch 477.

Actuation of the microswitch 477 preferably sets or enables the circuit (not shown) to which the microswitches 438 are connected to read the information magnetically encoded on the passcard.

It will be appreciated that a tremendous number of combinations of locking and/or reading codes may be provided on the program cards and passcards used in conjunction with the lock-reader unit 420 shown in FIGS. 10, 10A and 10B. The code (i.e., the arrangement of magnetized spots 437) may be used to permit or deny the passcard holder access to a restricted area, to identify him, and/or to provide a variety of information to a date acquisition system (not shown) in which the lock-reader unit 420 may be integrated.

Figures 11, 11A:
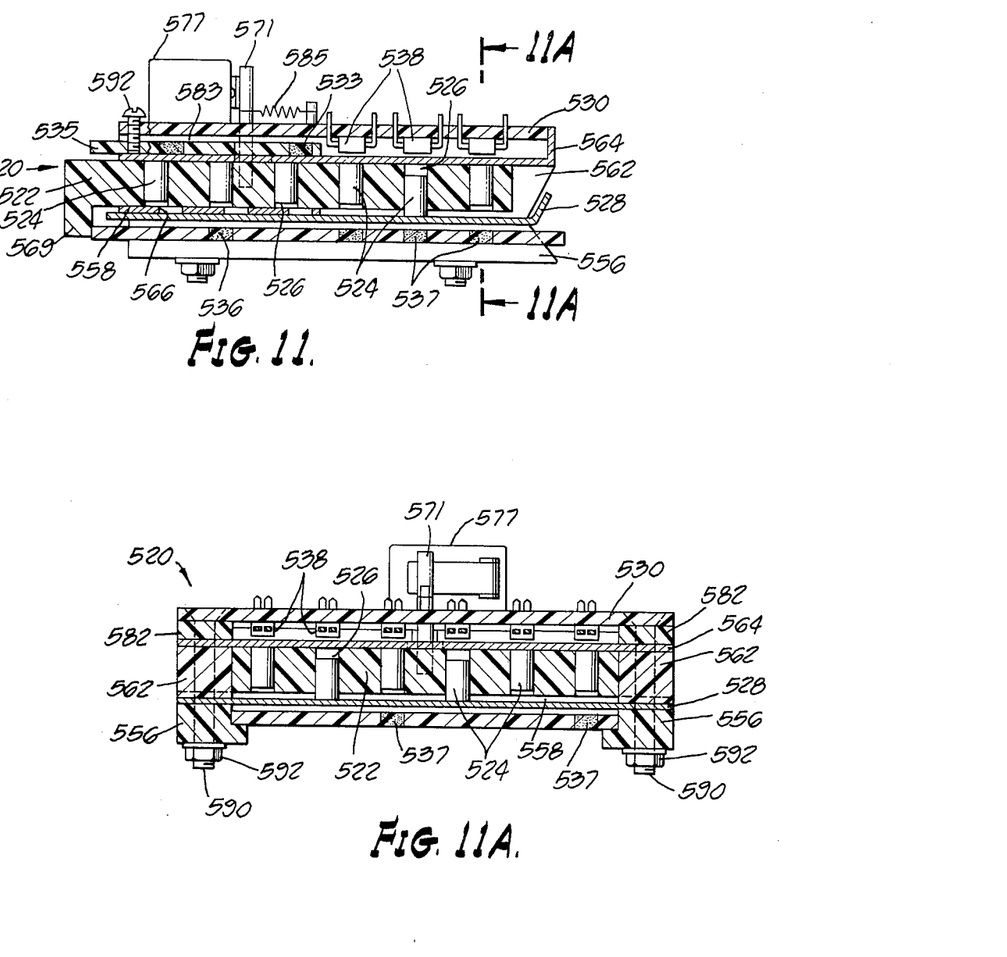
FIG. 11 is a sectional elevation view of another embodiment of a combination card reader-lock mechanism constructed in accordance with the present invention.
FIG. 11A is a sectional elevation view taken along the plane 11A—11A of FIG. 11 and looking in the direction of the arrows.

The embodiment of the lock-reader unit 520 of the present invention shown in FIGS. 11 and 11A is very similar to the lock-reader 420 shown in FIGS. 10, 10A and 10B. The major difference between the lock-reader 520 (FIGS. 11 and 11A) is that the printed circuit board 530 of the lock-reader 520 is disposed above the magnet-carrying block 522 (in contrast to the embodiment of FIGS. 10, 10A and 10B wherein the printed circuit board 430 is disposed beneath the magnet-carrying block 422).

Referring to FIGS. 11 and 11A, the programmable lock portion of the lock-reader unit 520 includes a magnet-carrying block 522 sandwiched between a locking plate 558 and an upper non-ferrous plate 564. The magnet-carrying block 522 is slidable between a pair of spaced side bars or rails 562, 562 (FIG. 11A). A lower non-ferrous plate 528 is also provided beneath the locking plate 558 to prevent magnets 524 from dropping out of the magnet-carrying block 522.

The magnet-carrying block 522 has a plurality of channels 526, 526 . . . 526 therein, each of which is adapted to slidably carry a generally cylindrical magnet 524. Each magnet 524 is slidable in its respective channel 526 between an upper position wherein it is out of locking position, and a lower position wherein it extends into a locking hole 566 in the lock plate 558 to prevent relative sliding movement between the magnet-carrying block 522 and the lock plate 558.

The locking plate 558 does not extend under the front or right side of the magnet-carrying block 522, as shown in FIG. 11. The magnets 524 in the channels 526 on the right side of the block 522 are provided for the purpose of establishing strong enough magnetic poles to trigger or actuate one or more of the magnetically-operable solid state switches 538.

As shown in FIG. 11A, a pair of substantially parallel guide bars 556, 556 together with the lower non-ferrous plate 528, define a slot for receiving a magnetically encoded passcard 534.

The passcard 534 is provided with a matrices of magnetized spots 536 and 537 thereon. The passcard 534 is comprised, at least in part, of a plastic or rubber binder material having ferromagnetic particles or powder suspended in and substantially evenly distributed therein. The magnetic spots 536 and 537 are magnetized in a direction substantially perpendicular to the surface of the card so as to provide one pole (e.g., North) extending toward one surface of the card and the opposite pole (e.g., South) extending toward the opposite surface of the card.

The lock-reader 520 shown in FIGS. 11 and 11A is also provided with a printed circuit board 530 having a plurality of magnetically-operable solid state switches 538, 538 . . . 538 mounted thereon. The switches 538, 538 . . . 538 are mounted on the printed circuit board 530 so that each switch will overlie and be in substantial vertical alignment with one of the magnets 524 in the forward portion of the magnet-carrying block 522 (i.e., the right hand portion of the magnet-carrying block, as viewed in FIG. 11).

As shown in FIG. 11, the printed circuit board 530 is spaced above the upper non-ferrous cover sheet 564 so as to define, together with a pair of spaced upper guide rails 582, 582, a slot 583 in the rear portion of the unit 520 (i.e., the left-hand side of the unit as shown in FIG. 11) which is adapted to receive a code activation set card 535.

The magnetically-operable solid state switches 538, 538 . . . 538, are devices which, like the switch 38 shown in FIGS. 1–5, are adapted to be actuated or triggered by a given magnetic pole (i.e., North or South) having a magnetic strength which is greater than some predetermined minimum.

The printed circuit board 530 has a microswitch 577 mounted thereon. The microswitch 577 is adapted to be actuated by an actuating pin 571 which extends upwardly from the magnet-carrying block 522 and through elongated slots (not shown) in the upper plate 564, the program card 535 and the printed circuit board 530, respectively. The actuator pin 571 (and, hence, the magnet-carrying block 522 in which it is mounted) is spring-biased toward the right (as viewed in FIG. 11) by means of a spring 585. Normally (i.e., in the absence of a properly coded passcard 534), the spring 585 will urge the actuator pin 571 and the magnet-carrying block 522 on which the pin is mounted toward the right (as viewed in FIG. 11) to a position where the actuator pin does not actuate the microswitch 577.

The rear end of the magnet-carrying block 522 (i.e., the left end, as shown in FIG. 11) is provided with a downwardly extending flange 569 which is adapted to be contacted and moved rearward (i.e., to the left as shown in FIG. 11) by a properly coded passcard 534.

As best shown in FIG. 11A, the printed circuit board 530, the upper guide rails 582, 582, the upper non-ferrous plate 564, the magnet block guide rails 562, 562, the locking plate 558, the lower non-ferrous plate 528 and the lower guide rails 556, 556 are held together in a relatively compact sandwich arrangement by any suitable means, such as mounting screws 590, and nuts 592, for example.

The lock-reader unit 520 of the present invention shown in FIGS. 11 and 11A operates in the following manner.

Prior to the insertion of a combination set card 535 and a passcard 534, all of the magnets 524, 524 . . . 524 are held, by force of gravity, in their lowermost position (not shown). The magnets 524 on the left side of the magnet-carrying block 522 have their lower ends extending into the holes 566 in the locking plate 558 to prevent movement of the magnet-carrying block 522 relative to the fixed locking plate 558.

To program the locking section of the lock-reader unit 520, a half-size program card or combination set card 535 having magnetized spots 533 thereon is inserted into the program card receiving slot 583. The program card 535 may be locked in place by means of a screw 592 which is adapted to be screwed downwardly and into a hole provided in the left end of the program card.

The magnetized spots 533 on the program card 535 will attract one or more of the locking magnets 524 upwardly, out of their respective underlying holes 566 in the locking plate 558.

When a passcard holder desires access to some restricted area, he places his passcard 534 in the passcard receiving slot 532. If the passcard is properly coded (i.e., if the magnetized spots 536 on the left side of the passcard 534 are properly positioned and polarized) the magnetized spots on the passcard will repel the remaining locking magnets 524 (i.e., those magnets on the left side of the lock-reader 520 which are not lifted by the magnetized spots 533 on the program card 535) upwardly and out of their respective underlying holes 566 in the locking plate 558, as shown in FIG. 11.

With all of the locking magnets 524 raised out of their locking holes 566 in the locking plate 558, the passcard 534 may be pushed inwardly (i.e., to the left, as viewed in FIG. 11) against the downwardly extending flange 569 on the rear (i.e., left) end of the magnet-carrying block 522 to force the magnet-carrying block 522 and the actuating pin 571 mounted thereon rearwardly. As the actuating pin 571 moves rearwardly it will trip or actuate the microswitch 577.

Actuation of the microswitch 577 preferably sets or enables the circuit (not shown) to which the microswitches 538 are connected to read the passcard and determine whether it is valid or not.

Like the lock-reader unit 420 shown in FIGS. 10, 10A and 10B, the lock-reader unit 520 of FIGS. 11 and 11A permit the use of a tremendous number of codes to be magnetically encoded on passcards to be used in conjunction therewith. The codes (i.e., the arrangement or pattern of the magnetic spots 536 and 537) may be used to provide access to authorized cardholders, identify each passcard holder and provide a variety of different types of information to a data acquisition center (not shown) in which the lock-reader unit 520 is installed.

With respect to all of the readers and reader-lock units described above and shown in the drawings, it is contemplated that the power input to the magnetically-operable solid state switches may be either steady or pulsed. It is also contemplated that the output from the circuit in which the magnetically-operable switches are integrated may be either parallel readout or serial readout.

While the invention of this patent has been described above and illustrated in the drawings with reference to specific preferred embodiments thereof, it is contemplated that numerous modifications, additions and other variations of the specific embodiments shown and described herein may be made to the present invention without departing from the spirit and scope thereof. Accordingly, it is intended that the scope of this patent be limited only by the scope of the appended claims.

I claim:

1. An apparatus for electronically sensing at least one magnetized portion of a card, comprising:
    a magnet and a solid state switching element mounted in relatively close proximity to one another;
    said switching element having at least two distinct states;
    said switching element being normally in one of its said states in the absence of a magnetic field from a specific magnet pole of at least a predetermined strength; said switching element being changeable to its other state when a magnetic field of at least a predetermined magnetic strength from a magnetic pole of specific polarity is moved into relatively close proximity therewith; and
    means for receiving a card having a magnetized portion therein for moving said magnet into sufficiently close proximity with said switching element to change said switching element from one of its states to the other of its states.

2. A card reading device for reading a magnetic code on a magnetically encoded card member, comprising:
    a magnet-carrying block having substantially parallel, opposite faces;
    a plurality of channels extending through said magnet-carrying block in a direction substantially perpendicular to the faces of said block;
    a plurality of magnets movably disposed in said channels in said magnet-carrying block; each of said magnets having a selected magnetic pole facing one of said faces of said block;
    a substrate mounted adjacent to and spaced from said one face of said magnet-carrying block;
    a plurality of magnetically responsive switching elements mounted on said substrate and facing said one face of said magnet-carrying block; and
    means disposed between said switching elements and said magnet-carrying block for receiving a card having magnetized portions therein;
    said magnets and said switching elements being arranged in corresponding patterns so that each of said switching elements is substantially aligned with one of said magnets; and
    each of said switching elements having at least two states; each of said switching elements being changeable from one of its said states to the other of its said states by a magnetic field above a predetermined magnetic strength eminating from a specific magnetic pole;
    whereby, when a properly magnetically encoded card is placed in said card receiving means, the magnetic fields of said magnetic elements in said card and said magnets will change the states of selected ones of said switching elements to produce an output signal.

3. A card reading device according to claim 2, wherein said one face of said magnet-carrying block faces downwardly and the other face of said magnet-carrying block faces upwardly; and wherein said substrate with said switching elements mounted thereon is disposed beneath said magnet-carrying block and spaced therefrom to define a card-receiving slot.

4. A card reading device according to claim 2 and further comprising means for retaining said magnets within their respective channels in said magnet-carrying block.

5. A card reading device according to claim 2, wherein said device is mounted in a substantially vertical position with its said one face being disposed in a substantially vertical plane; and means for biasing said magnets, in the absence of a properly coded card, to a position spaced sufficiently from their respective switching elements so as to leave said switching elements in their normal state; and said card-receiving means comprising a card receiving slot disposed between said magnets and said switching elements, whereby, when a properly magnetically encoded card is inserted between said magnets and said switching elements at least one of said magnets will be moved toward its associated switching element to change the state of said switching element.

6. A card-operable lock-reader apparatus comprising:

a magnet-carrying member;
at least one magnet movably disposed in said magnet-carrying member; said magnet being movable between a first position and a second position;
a switching element having at least two states;
said switching element being disposed adjacent to said magnet-carrying member;
said switching element being normally in one of its said states in the absence of a magnetic field from a specific magnetic pole of at least a predetermined magnetic strength; said switching element being changeable to another of its said states when a magnetic field of at least a predetermined magnetic strength from a magnetic pole of specific polarity is moved into relatively close proximity therewith;
said magnet being disposed in said magnet-carrying member with one of its said poles facing said switching element; said one pole of said magnet which faces said switching element being of said specific polarity and being of at least said predetermined magnetic strength so as to change the state of said switching element when said one magnetic pole of said magnet is in sufficiently close proximity with said switching element;
a locking plate disposed adjacent to said magnet-carrying member; said locking plate having an opening therein adapted to receive a portion of said magnet in said locking plate when said magnet is in its said first position, so as to lock said magnet-carrying member and said locking plate against movement relative to one another;
said switching element, said magnet and said hole in said locking plate being disposed in substantial alignment with one another;
said magnet in said magnet-carrying member having a portion thereof extending into said opening in said locking plate when said magnet is in its said first position so as to lock said magnet-carrying member and said locking plate relative to one another; said pole of said magnet which faces said switching element being spaced from said switching element, when said magnet is in its said first position, by such a distance that said pole will not change the state of said switching element;
a card-receiving station disposed in relatively close proximity to said magnet-carrying member for receiving a card having a portion therein which, if properly positioned, will move said magnet to its said second position;
said magnet, when in its said second position, having its said one pole in sufficiently close proximity to said switching element to change the state of said switching element.

7. A card-operable lock-reader apparatus comprising:

a magnet-carrying block;
a plurality of magnets movably disposed in said magnet-carrying block; each of said magnets in said block being movable between a first position and a second position;
a plurality of switching elements mounted on a substrate in relatively close proximity to said magnet-carrying block; each of said switching elements having at least two states;
a locking plate having a plurality of openings therein; each of said openings in said locking plate being adapted to receive a portion of one of said magnets to prevent relative movement between said locking plate and said magnet-carrying block;
said switching elements being arranged in a predetermined pattern;
some of said magnets in said magnet-carrying block being arranged in a predetermined pattern corresponding to the predetermined pattern of said switching elements whereby each switching element will be in substantial alignment with one of said magnets;
said holes in said locking plate being arranged in a predetermined pattern;
some of said magnets being arranged in a predetermined pattern corresponding to the predetermined pattern of said holes in said locking plate, whereby each of said holes in said locking plate is disposed in substantial alignment with one of said magnets;
each of said switching elements being normally in one of its said states in the absence of a magnetic field from a specific magnetic pole of at least a predetermined magnetic strenth; each of said switching elements being changeable to another of its said states when a magnetic field of at least a predetermined magnetic strength from a magnetic pole of specific polarity is moved into relatively close proximity therewith;
each of said magnets which are arranged in said predetermined pattern corresponding to the predetermined pattern of said switching elements being disposed in said magnet-carrying block with one of its said poles facing one of said switching elements; said one pole of each of said magnets which faces one of said switching elements being of said specific polarity and being of at least said predetermined magnetic strength so as to change the state of its corresponding switching element when said one magnetic pole of said magnet is in sufficiently close proximity with its corresponding switching element;
each of said magnets which are arranged in said predetermined pattern corresponding to the predetermined pattern of said holes in said locking plate having a portion thereof extending into one of said openings in said locking plate when said magnets are in their said first position, so as to lock said magnet-carrying block and said locking plate against movement relative to one another;

means defining a card-receiving station in relatively close proximity to said magnet-carrying block; said card-receiving station having a plurality of magnetic portions therein for moving at least some of said magnets out of said openings in said locking holes in said locking plate, and a plurality of magnetic portions for moving at least some of said magnets into sufficiently close proximity with said switching elements so as to change the states of at least some of said switching elements.

8. A card-operable lock-reader apparatus comprising:
- a magnet-carrying block disposed in a generally horizontal attitude with one surface thereof facing upwardly and the opposite surface thereof facing downwardly;
- a plurality of channels extending through said magnet-carrying block in a direction substantially perpendicular to the said surfaces thereof;
- a plurality of magnetic locking pins slidably disposed in said channels in said magnet-carrying block for movement between an upper position and a lower position;
- a locking plate disposed beneath said magnet-carrying block and directly adjacent thereto; said locking plate having a plurality of holes for receiving the lower portions of at least some of said magnetic locking pins when said locking pins are in their said lower position;
- means defining a card-receiving slot disposed beneath said locking plate; said card receiving slot being adapted to receive a passcard having magnetized portions thereon for repelling at least some of said locking pins out of their said lower position;
- a card-receiving slot disposed above said magnet-carrying block for receiving a program card which is provided with magnetic spots therein for attracting at least some of said locking pins into their said upper position; and
- a substrate having a plurality of magnetically-operable switches thereon disposed beneath said passcard receiving slot for sensing the magnetic spots on at least a portion of said passcard;
- each of said magnetically-operable switches having at least two states; each of said magnetically-operable switches being normally in one of its said states in the absence of a magnetic field from a specific magnetic pole of at least a predetermined magnetic strength; each of said magnetically-operable switches being changeable to another of its said states when a magnetic field of at least a predetermined magnetic strength from a specific magnetic pole is moved into relatively close proximity therewith;
- whereby, when a passcard is inserted into said passcard receiving slot and has magnetized spots thereon which repel one or more of said magnetic locking pins out of relatively close proximity with one or more of said magnetically-operable switches the state of said switch or switches will be changed.

9. A card-operable lock-reader apparatus, comprising:
- a magnet-carrying block disposed in a generally horizontal attitude with an upper surface facing upwardly and a lower, substantially parallel surface facing downwardly;
- a plurality of channels extending through said magnet-carrying block in a direction substantially perpendicular to the said surfaces thereof;
- a plurality of generally elongated magnets slidably disposed in said channels in said magnet-carrying block for movement between an upper position and a lower position;
- a locking plate disposed beneath said magnet-carrying block; said locking plate having a plurality of holes for receiving the lower portions of at least some of said magnets when said magnets are in their said lower position;
- means defining a card-receiving slot disposed beneath said locking plate; said card-receiving slot being adapted to receive a passcard having magnetized portions thereon for repelling at least some of said magnets out of their said lower position;
- a card-receiving slot disposed above said magnet-carrying block for receiving a program card which is provided with magnetic spots therein for attracting at least some of said magnets into their said upper position; and
- a substrate having a plurality of magnetically-operable switches thereon disposed above said magnet-carrying block; each of said switches being substantially aligned with one of said magnets;
- each of said magnetically-operable switches having at least two states; each of said magnetically-operable switches being normally in one of its said states in the absence of a magnetic field from a specific magnetic pole of at least a predetermined magnetic strength; each of said magnetically-operable switches being changeable to another of its said states when a magnetic field of at least a predetermined magnetic strength from a specific magnetic pole is moved into relatively close proximity therewith;
- whereby, when a passcard having magnetized spots thereon which repel one or more of said magnets into their said upper position, the state of said magnetically-operable switches aligned with said repelled magnets will be changed.

10. A magnetically-operable mechanism of the type adapted to have its combination set by a code combination set means and unlocked by a code activation card having a corresponding combination, comprising;
- a magnet block having a plurality of openings spaced and arranged in a predetermined pattern;
- a plurality of locking pins in said openings, a lock plate having a plurality of openings adapted to register in the locked position with the openings in said magnet block;
- means for bringing code combination set means into cooperative relationship with one face of said magnet block to operate on selected ones of said locking pins, and means for bringing a code activation card into cooperative relationship with one face of said magnet block to operate on selected locking pins so as to unlock the mechanism; and
- a plurality of magnetically-operable switches disposed in a predetermined pattern so as to sense the combination on a code activation card brought into cooperative relationship with said magnet block;
- each of said magnetically-operable switches having two states; and at least some of said magnetically-operable switches being adapted to be changed from one of their states to another of their states when a code activation card is brought into cooperative relationship with said mechanism.

11. A card-operable lock-reader apparatus, comprising:
- a magnet-carrying block having a first set and a second set of channels therein;
- a plurality of magnets slidably disposed in each channel of each of said sets of channels for movement between a first position and a second position; said magnets in said first set of channels comprising locking magnets; said first position of said locking magnets comprising a locking position; said second position of said locking magnets comprising an unlocked position;
- a locking plate disposed beneath the portion of said magnet-carrying block having said first set of channels therein; said locking plate having a plurality of openings therein for receiving the lower portions of the locking magnet in said first set of channels to prevent relative movement between said locking plate and said magnet-carrying block;
- a substrate having a plurality of magnetically-operable switches thereon disposed adjacent to the portion of said magnet-carrying block having said second set of channels and magnets therein;
- each of said magnetically-operable switches having at least two states; each of said magnetically-operable switches being normally in one of its said states in the absence of a magnetic field from a specific magnetic pole of at least a predetermined magnetic strength; each of said magnetically-operable switches being changeable to another of its said states when a magnetic field of at least a predetermined magnetic strength from a specific magnetic pole is moved into relatively close proximity therewith; and
- means defining a card-receiving station for receiving a passcard having magnetized spots thereon for said locking magnets between their first and second positions.

12. A card-operable lock-reader apparatus according to claim 11, wherein said substrate having said magnetically-operable switches thereon is disposed above said magnet-carrying block.

13. A card-operable lock-reader apparatus according to claim 11, wherein said means defining a card-receiving station comprises a card slot disposed beneath said magnet-carrying block.

14. A card-operable lock-reader apparatus according to claim 11, wherein said substrate having said magnetically-operable switches thereon is disposed above said magnet-carrying block; said lock plate is disposed beneath said magnet-carrying block; and said card-receiving station comprises a card receiving slot disposed beneath said magnet-carrying block.

* * * * *

UNITED STATES PATENT OFFICE
CERTIFICATE OF CORRECTION

Patent No. 3,995,145        Dated November 30, 1976

Inventor(s) Newton T. Harris III

It is certified that error appears in the above-identified patent and that said Letters Patent are hereby corrected as shown below:

Col. 1, Line 14:   Insert "and" following "2,648,729"

Col. 1, Line 47:   "However" should be "Moreover"

Col. 2, Line  3:   Insert "of" after "type"

Col. 2, Line 61:   "cord" should be "card"

Col. 3, Line 12:   Insert "elevation" after "sectional"

Col. 6, Line 48:   Change "the" to "a"

Col. 6, Line 57:   "magent" should be "magnet"

Col. 6, Line 63:   "between 138," should read "switches 138,"

Col. 6, Line 68:   "magentic" should read "magnetic"

Col. 7, Lines 65-66:   "attached" should read "attracted"

Col. 9, Line 56:   "light 354" should read "lights 354"

UNITED STATES PATENT OFFICE
CERTIFICATE OF CORRECTION

Patent No. 3,995,145   Dated November 30, 1976

Inventor(s) Newton T. Harris III

It is certified that error appears in the above-identified patent and that said Letters Patent are hereby corrected as shown below:

Col. 15, Line 6:  "plate 538" should read "plate 558"

Col. 21, Line 19: "locking magnet" should read "locking magnets"

Signed and Sealed this second Day of August 1977

[SEAL]

Attest:

RUTH C. MASON  
Attesting Officer

C. MARSHALL DANN  
Commissioner of Patents and Trademarks